US007050180B1

(12) United States Patent
Bingham et al.

(10) Patent No.: US 7,050,180 B1
(45) Date of Patent: May 23, 2006

(54) LOADING FACILITY FOR SMALL PRINTER MEDIA

(75) Inventors: Jeffrey G. Bingham, Vancouver, WA (US); Carol Chia-Sheng Hsu, Vancouver, WA (US); Corlene M. Ankrum, Vancouver, WA (US); Chad Lockart, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1064 days.

(21) Appl. No.: 09/598,557

(22) Filed: Jun. 21, 2000

(51) Int. Cl.
*G06F 15/00* (2006.01)

(52) U.S. Cl. ....................................... 358/1.1; 271/3.01

(58) Field of Classification Search ................. 358/1.1, 358/1.2, 1.6, 296, 298, 303, 449, 1.5, 1.11, 358/1.12, 1.13, 1.14, 1.15; 400/624, 625, 400/605, 578; 399/369, 377; 271/3.01, 271/3.03, 8.1, 9.01
See application file for complete search history.

(56) References Cited

U.S. PATENT DOCUMENTS 4,522,382 A * 6/1985 Chu et al. .................. 270/1.02
4,861,017 A * 8/1989 Yamamoto et al. ..... 271/258.03
5,116,034 A * 5/1992 Trask et al. ..................... 271/2
5,188,351 A * 2/1993 Gysling ....................... 271/171
5,188,353 A * 2/1993 Parks ......................... 271/184
5,287,164 A * 2/1994 Watanabe ................... 399/391
5,328,166 A * 7/1994 Hokamura .................. 271/171
5,435,537 A * 7/1995 Gysling ................... 271/10.05
5,599,120 A * 2/1997 Conrad et al. .............. 400/624
5,746,528 A * 5/1998 Mayer et al. ............... 400/625
5,823,522 A * 10/1998 Fujiwara et al. ........... 271/4.08
5,863,038 A * 1/1999 Zoltner ........................ 271/127
5,901,952 A * 5/1999 Hourtash ..................... 271/171
6,693,728 B1 * 2/2004 Kinoshita et al. ........... 358/296

* cited by examiner

*Primary Examiner*—Mark Wallenson

(57) ABSTRACT

A printer having a media tray with a media support surface and a media edge registration surface. A removable media holder has a lower portion contacting the media support surface, and defines a media receptacle above the lower portion, and having a lateral opening facing the registration surface. The media tray may be sized for conventional letter sized media, and the holder may contain smaller media and be entirely contained in the tray. The holder may be used by removing media from the tray and inserting the holder with small media included.

36 Claims, 4 Drawing Sheets

LOADING FACILITY FOR SMALL PRINTER MEDIA

FIELD OF THE INVENTION

This invention relates to computer printers, and particularly to paper trays and facilities for loading media to be printed.

BACKGROUND AND SUMMARY OF THE INVENTION

Computer printers are generally needed to print a variety of media sizes. A printer may have a maximum medium width capacity, with the capacity to accommodate a wide range of lengths, as well as widths smaller than the maximum. Some printers, such as high speed laser printers, provide dedicated paper trays for each media size. Lower cost printers such as mass-market ink jet printers generally have only one tray, typically accommodating letter width (8.5") media.

Smaller media may be used in such printers, which have adjustable media edge stops that slide to constrain the side edges of smaller width media. Media shorter than standard letter sized lengths is normally accommodated by feeding the smaller media into a tray or input slot until its leading edge abuts a stop. While this has proven workable in some instances to accommodate envelopes and smaller index cards, in other cases there are disadvantages.

Some printers have paper trays that are not removable, and which extend well into the body of the printer, with a significant length between an insertion aperture and the leading edge stop. For media shorter than this distance, or longer by an inadequate amount, it is difficult to properly insert media, or to extract unprinted media from the tray.

In addition, many such printers are designed for compact size, and do not accommodate additional media trays or special apertures. Even for printers having special envelope apertures, these may not be suited for the shortest cards, nor may they be readily adjustable in width to ensure against skew.

A further difficulty in accommodating smaller media sizes is that many printers rely on a common media registration scheme, such as using one edge of a media tray as a fixed side edge reference for all media sizes. Any measures to accommodate smaller media that do not provide contact with this reference surface will require printer firmware changes, generating cost and complexity disadvantages.

The present invention overcomes the limitations of the prior art by providing a printer having a media tray with a media support surface and a media edge registration surface. A removable media holder has a lower portion contacting the media support surface, and defines a media receptacle above the lower portion, and having a lateral opening facing the registration surface. The media tray may be sized for conventional letter sized media, and the holder may contain smaller media and be entirely contained in the tray. The holder may be used by removing large media from the tray and inserting the holder with small media included.

DETAILED DESCRIPTION OF A PREFERRED EMBODIMENT

Figure 1:
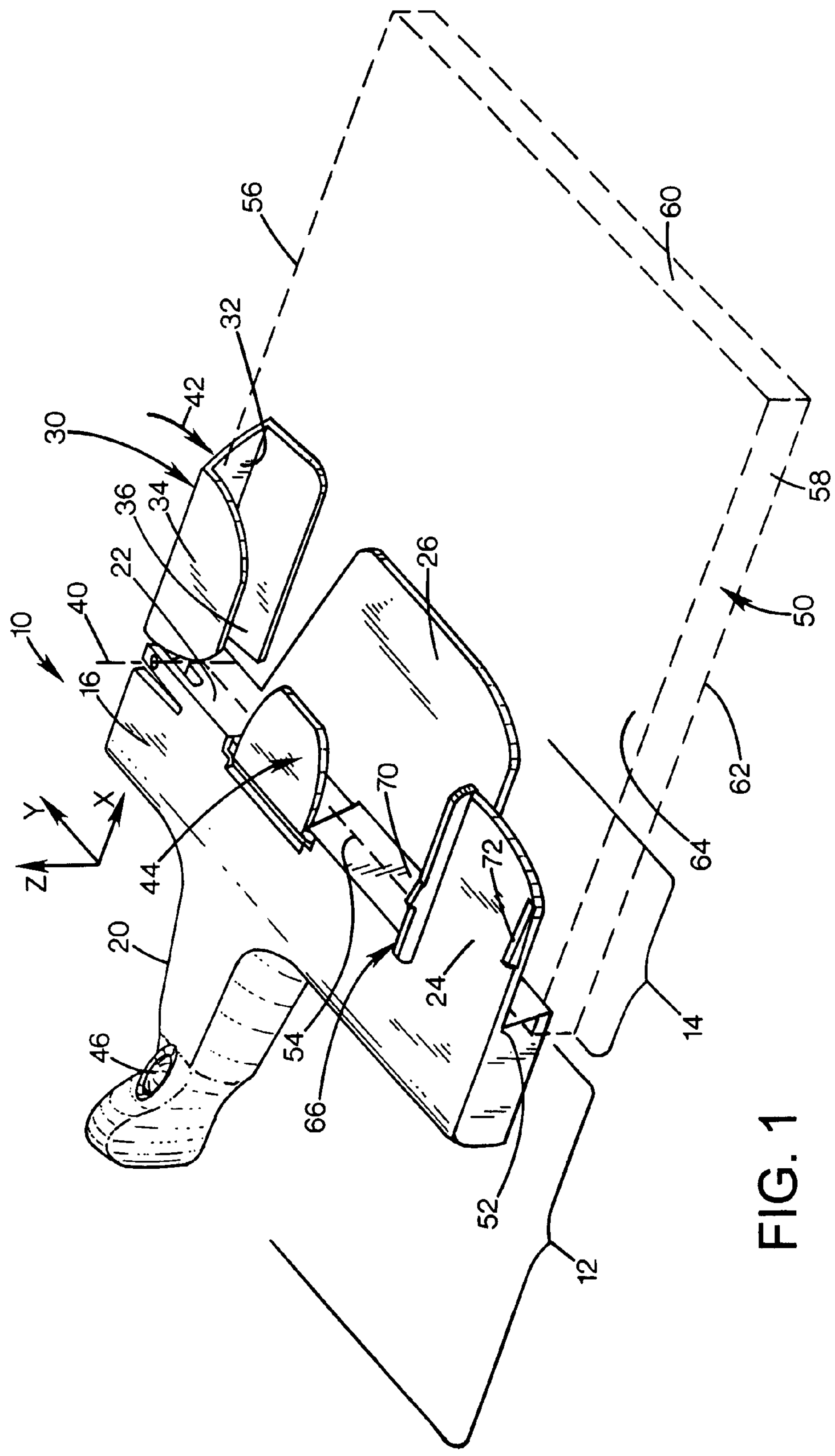
FIG. 1 is a perspective view of a media holder according to a preferred embodiment of the invention.

FIG. 1 shows a media holder 10 having a handle portion 12 and a media portion 14. The handle portion includes a hollow body 16 extending the full width of the holder along the Y axis as indicated, and an elongated handle 20 extends from the body in the negative X direction. The indicated X axis corresponds to a media feed direction (the positive direction being "forward" or down-feed), the Y axis corresponds to media width (the positive direction being toward the "left" as viewed from the trailing edge of the media), and the Z axis corresponds to media stack height and is perpendicular to the plane of media (the positive direction being "up").

A leading edge face 22 of the body faces the X direction and defines a rear limit of a media receptacle space. The media receptacle space is defined above an upper panel 24 extending forward from the upper surface of the body 16, along a rightmost portion of the body, and above the face 22. The receptacle is defined below by a support panel 26 extending forward from the lower edge of the face 22, at a medial portion of the face.

A spring-biased channel member 30 is pivotally attached to a left corner of the body, and defines a channel 32 that captures the left edge of media in the receptacle to form the left limit of the receptacle. The channel member includes an upper panel 34 and lower panel 36, which further define the upper and lower limits of the receptacle, the panels being parallel to panels 24 and 26, respectively. The channel member is pivotally attached to the body at a pivot axis 40 parallel to the Z axis, and is configured to bias the free end of the channel toward the right, or negative Y direction, as indicated by arrow 42.

A media clamp 44 further defines the upper limit of the receptacle, and is movable between an unclamped position as shown, in which the clamp is parallel to the upper panel 24, and a clamped position in which the clamp is biased toward the lower panel 26 to grip any media residing in the receptacle. A manually operable button 46 is mechanically engaged to the clamp, so that pressing on the button biases the clamp to the clamped position, and releasing the button allows the clamp to return to the unclamped position. A spring normally biases the clamp to the unclamped position to facilitate media loading.

The right (negative Y) side of the media receptacle 14 is entirely open. There are no obstructions between the planes of the upper and lower panels 24 and 26 to the right of the channel 30 and forward of the face 22. This permits a stack of media 50 to extend beyond the rightmost edge 52 of the holder by any desired amount. The media stack has a trailing edge 54 abutting the face 22, a left edge 56 captured by and pressed upon by the channel 30, a right edge 58 extending laterally beyond any portion of the holder, a leading edge 60 extending well beyond the holder in the X direction, a lower surface 62 (of the bottom sheet) contacting the upper surface of the lower panel 26, and an upper surface (of the top sheet) parallel to and below the lower surface of the upper panel 24. When the clamp is in the clamped position, it contacts this upper surface of the media.

A registration ridge 66 is a straight elongated planar ridge oriented parallel to the X axis and extending upward from the left edge of the upper panel 24. The ridge runs from a point just rearward of the face 22, to the free end of the panel 24. It has a constant thickness and height, except for a protruding wedge 70 having a gently sloped leading ramp portion, and a sharply sloped trailing edge. A second wedge 72 protrudes vertically from the far right edge of the upper panel 24 near the free end.

Figure 2:
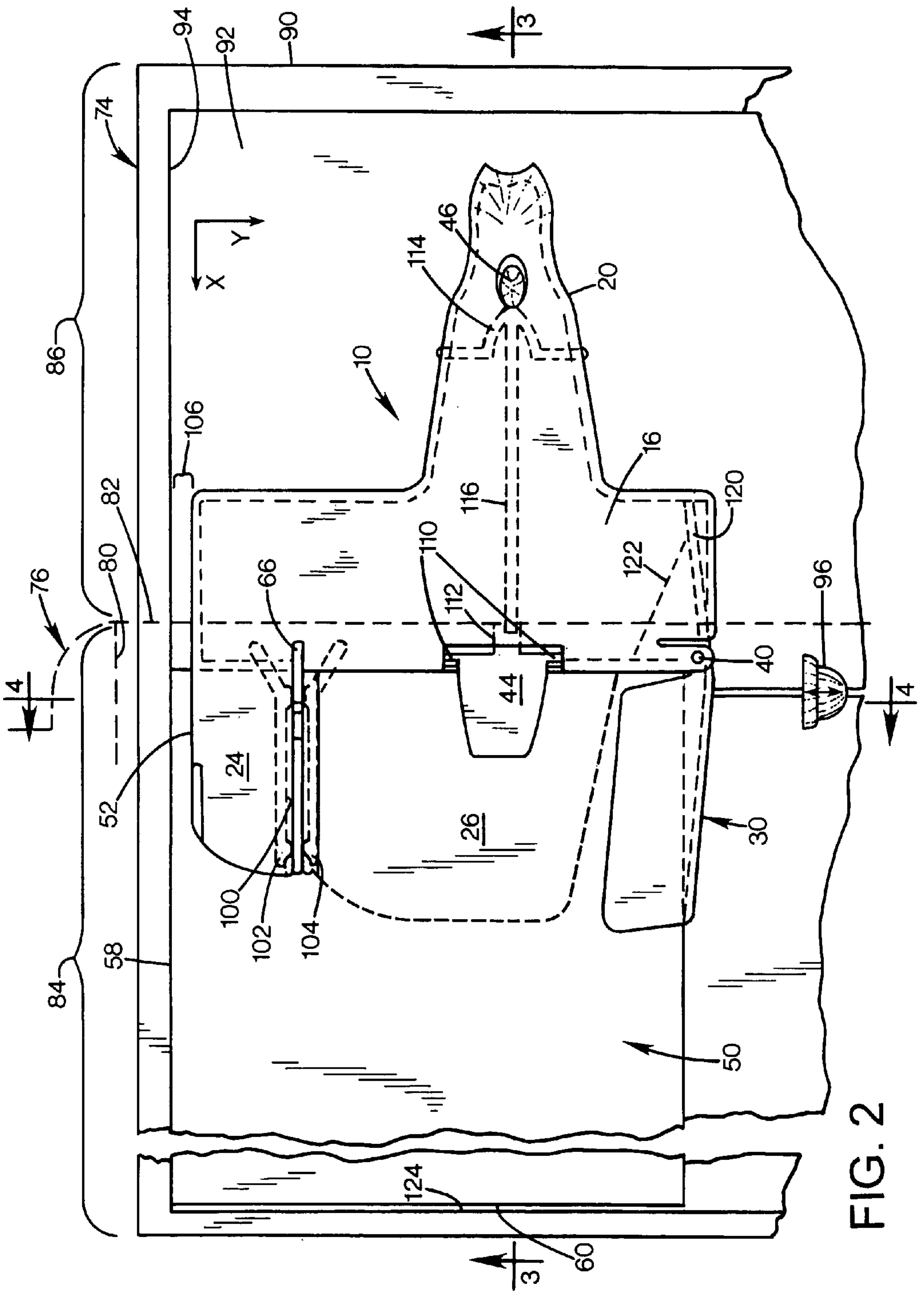
FIG. 2 is a plan view of the media holder of FIG. 1, inserted in a printer according to the preferred embodiment of the invention.

FIG. 2 shows how the entire media holder 10 and the media 50 it contains are entirely contained within a standard letter sized media tray 74 of a printer 76. The printer defines a tray-receiving aperture 80 defined in a front surface 82 of the printer housing. A large first portion 84 of the tray 74 is received in the printer housing and is not readily accessible to a user. A remaining tray portion 86 extends from the printer housing. The tray has a peripheral edge 90 that accommodates normal letter-sized or comparable media, and which surrounds a tray floor surface 92 on which such media normally rests. A right edge alignment surface 94 of the tray provides registration of all sizes of media, and a slide stop 96 closely captures the left edge of normal media sheets in the tray when the holder is not present.

The printer includes a registration channel 100 defined between a pair of rails 102, 104 that depend downwardly from an upper surface of the printer aperture just inside the aperture. The pair are splayed outward to provide a lead-in guide for the ridge 66 to be inserted and closely received between them. With the ridge so received, the right edge 52 of the holder is spaced apart from the tray wall 94 by a gap 106. In addition to being constrained against lateral movement, it is constrained against yaw misalignment, because the channel has significant length of contact with the closely received ridge.

FIG. 2 also illustrates other features of the media holder. The clamp 44 is pivotally attached to the body 16 by laterally extending pins 110, and includes a rear tab 112. The button 46 is connected to a frame 114 pivotally attached to the handle 20, and having an elongated arm 116 with a free end that engages the tab of the clamp. When the button is pressed, the arm elevates the tab, and the clamp is biased downward. A spring (not shown) normally biases the clamp to the unclamped or elevated position to facilitate loading of media. The channel member 30 includes a rear portion 120 extending within the body 16 rearward of the pivot axis 40. A leaf spring 122 in the body biases the rear portion 120 laterally, thereby biasing the channel portion medially.

In the illustrated embodiment, the media portion 14 of the holder is entirely received within the printer housing, behind the housing surface 82. Thus, the media is also entirely contained within the printer, so that the holder is essential for inserting and extracting media cards of typical sizes such as 4"×6" and Hagaki size (100×148 mm). The handle 20 and button 46 are well clear of the printer housing for manual access, even as the leading edge 60 abuts or nearly abuts a tray wall surface 124.

Figure 3:
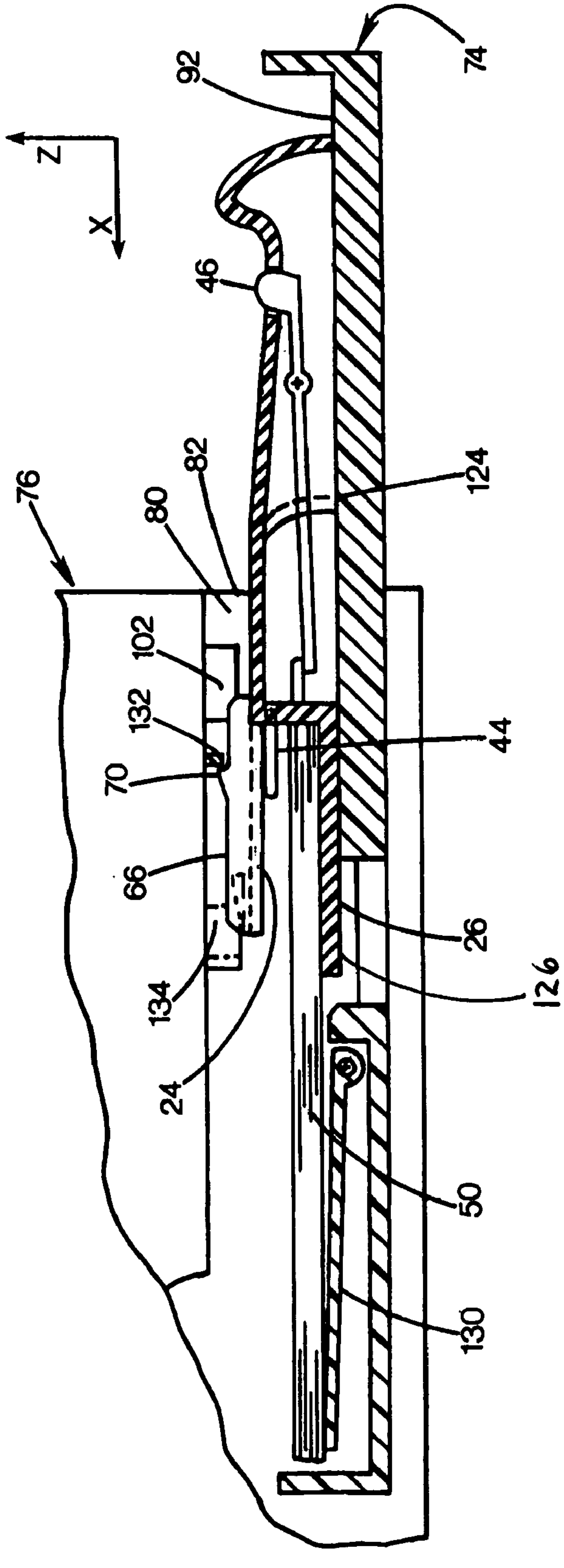
FIG. 3 is a sectional side view of the media holder of FIG. 1, inserted in a printer according to the preferred embodiment of the invention.

FIG. 3 shows how a lower surface 126 of the holder directly contacts the tray floor 92. The lower panel 26 supports the media 50 at a level slightly above the floor. The media 50 extends well beyond the forward end of the holder into the printer, above an elevator 130 that operates to raise the leading edge of the media stack into contact with a pick roller (not shown).

The depth of insertion of the holder is controlled by the position of the notch 70 on the ridge 66, with respect to a cross member 132 that depends downward from the ceiling of the tray aperture in the printer housing. The cross member is sized to slightly interfere with the notch, providing a positive feedback when the proper depth has been reached. The leading slope of the notch will not significantly resist insertion, and will cause the upper panel 24 to flex downward slightly until the notch passes the cross member. Upon this, the panel will flex upward, providing a tactile feedback as the cross member bypasses the rear of the notch. The rear of the notch is sloped adequately from the vertical to facilitate extraction, albeit with significantly greater force to prevent accidental extraction. A second cross member 134 is positioned to engage the second notch for a different insertion depth suited to a different media size. Each notch and cross member combination is selected for a given media length.

Figure 4:
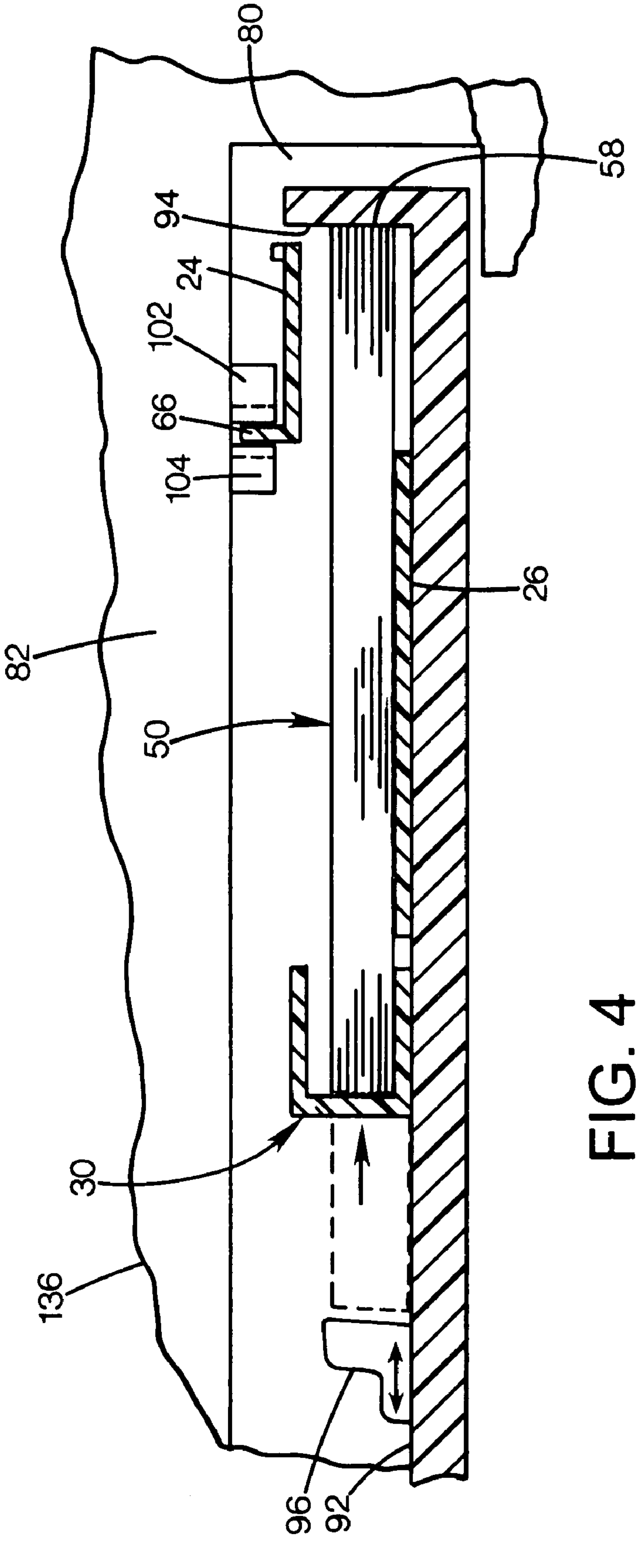
FIG. 4 is a sectional end view of the media holder of FIG. 1, inserted in a printer according to the preferred embodiment of the invention.

FIG. 4 illustrates how the channel 30 biases the right edge 58 of the media 50 against the registration surface 94 of the tray. The ridge 66 is closely received between the guides 102, 104, which are shown depending from the upper ceiling of the aperture. The normal position of conventional full width media 136 is illustrated to show how the holder and card media occupy the same position in the tray as does conventional media.

In the preferred embodiment, when a user wishes to print on small card media other than the conventional letter or similar media already in the printer, he or she must first remove all the standard media. The holder is loaded with card media, and is inserted into the tray and printer, with the right edge of the media roughly following the wall 94 of the tray. As the leading edge of the media is inserted into the printer aperture, the ridge 66 approaches the splayed guides of the elements 102, 104. The ridge normally first contacts the left guide 104, which shifts the holder to the right, while the media rides against the right tray wall. This causes the channel 30 to bend outwardly against the biasing force of the spring, so that the biasing force is maintained via the media against the tray side wall. With the ridge fully centered between the guides, insertion continues until a snap is sensed by the user from the trailing edge of the ridge passing over the cross member. For smaller card media, the user may push past the first snap until the second snap is detected. The holder and media are then fully inserted and printing may begin. After printing on the card media is concluded, the user grasps the handle, presses the button (assuming any remaining card media in the holder) to clamp the media, and withdraws the holder and media from the tray. After replacing full size media in the tray, normal printing may resume.

While the above is discussed in terms of preferred and alternative embodiments, the invention is not intended to be so limited.

What is claimed is:

1. A printer comprising:

a media tray with a media support surface and a media edge registration surface, a removable media holder having a lower portion contacting the media support surface; and the holder defining a media receptacle above the lower portion, and having a lateral opening facing the registration surface, the opening being configured to permit media in the receptacle to pass through the opening into contact with the registration surface.

2. The printer of claim 1 wherein the media tray is sized to receive conventional letter sized media and the holder is sized to receive smaller media.

3. The printer of claim 1 wherein the media tray, when fully inserted into the printer for printing operations, has a first portion contained in a printer body, and a second portion extending from the printer body, wherein the media receptacle is largely received in the first portion, wherein the holder has a handle extending from the receptacle and occupying the second portion of the tray.

4. The printer of claim 1 wherein the media tray includes a first registration element defining a surface parallel to the media edge registration surface, and wherein the holder includes a second registration element contacting the first registration element.

5. The printer of claim 4 wherein the holder includes a lateral portion extending toward the edge registration surface and spaced apart therefrom when the first and second registration elements are in contact.

6. The printer of claim 4 wherein the first and second registration elements define an elongated line of contact, such that the holder is constrained against skewed misalignment.

7. The printer of claim 1 wherein the holder includes an edge registration element at least in part defining the media receptacle, and opposite the edge registration surface of the tray, such that media is laterally constrained by the holder edge registration element and the tray edge registration surface.

8. The printer of claim 7 wherein the edge registration element is movable relative to a remainder of the holder.

9. The printer of claim 7 wherein the edge registration element is biased toward the tray edge registration surface.

10. The printer of claim 1 wherein the holder includes a manually operable clamp for engaging and securing media in the media receptacle.

11. The printer of claim 1 including a clamp movable between a clamped position, wherein the clamp is configured to engage the media, and an unclamped position, wherein the clamp is resiliently biased towards the unclamped position.

12. The printer of claim 11 wherein the clamp pivots between the clamped position and the unclamped position.

13. The printer of claim 11 including a manually actuatable button operably coupled to the clamp and configured to actuate the clamp to the clamped position.

14. The printer of claim 1 wherein the printer includes a body configured to receive the tray, the body having:

a first holder registration surface extending parallel to the media edge registration surface; and a registration ridge coupled to the holder and configured to slide along the first holder registration surface during movement of the holder relative to the tray.

15. The printer of claim 14 wherein the body includes a second holder registration surface, wherein the first holder registration surface and the second holder registration surface form a channel configured to receive the registration ridge.

16. The printer of claim 15 including a lead-in guide adjacent the channel.

17. The printer of claim 15 wherein one of the tray and the printer body forms an aperture configured to receive the holder and wherein the printer further includes:

a first formation on the ridge; and a second formation opposite the ridge and configured to engage the first formation during insertion of the holder to a first depth into the aperture, wherein one of the first formation and the second formation is resiliently biased towards the other of the first formation and the second formation.

18. The printer of claim 17 wherein the first formation comprises a notch and wherein the second formation comprises a cross member.

19. The printer of claim 17 including a third formation opposite the ridge and configured to engage the first formation during insertion of the holder to a second greater depth into the aperture, wherein one of the first formation and the third formation is resiliently biased towards the other of the first formation and the third formation.

20. The printer of claim 1 wherein at least one of the tray and a remainder of the printer forms an aperture configured to receive the holder and wherein the printer further includes:

a first formation coupled to the holder;

a second formation opposite the first formation and configured to engage the first formation during insertion of the holder to a first depth into the aperture, wherein one of the first formation and the second formation is resiliently biased towards the other of the first formation and the second formation; and a third formation opposite the first formation and configured to engage the first formation during insertion of the holder to a second greater depth into the aperture, wherein one of the first formation and the third formation is resiliently biased towards the other of the first formation and the third formation.

21. The printer of claim 1 wherein the printer forms an aperture into which the tray is inserted and wherein the holder is configured to be moved from a fully inserted to a completely removed position from the tray while the tray is fully inserted into the aperture for printing operations.

22. A media holder for a printer having a media tray with a media support surface and a media edge registration surface, the holder comprising:

a body having a lower portion contacting the media support surface; and the holder defining a media receptacle above the lower portion, and having a lateral opening facing the registration surface, the opening being configured to permit media in the receptacle to pass through the opening into contact with the registration surface.

23. The media holder of claim 22 wherein the media holder has a profile smaller than that of a conventional letter sized media, such that the holder may be received in the media tray.

24. The media holder of claim 22 wherein the holder includes an elongated registration element extending in a line parallel to the registration surface of the tray.

25. The media holder of claim 22 wherein the holder includes an edge registration element at least in part defining the media receptacle, and opposite the edge registration surface of the tray, such that media is laterally constrained by the holder edge registration element and the tray edge registration surface.

26. The media holder of claim 25 wherein the edge registration element is movable relative to the holder.

27. The media holder of claim 25 wherein the edge registration element is biased toward the tray edge registration surface.

28. The holder of claim 22 wherein the holder is configured to be completely withdrawn from the tray.

29. A method of printing comprising:

providing a printer having a media tray sized to receive a first size of media such that media is drawn from the tray in an input direction and having a lateral media edge registration surface substantially parallel to the input direction;

if there is media in the tray, removing the media from the tray;

positioning in the tray a media holder containing small media of a second smaller size; and abutting the small media against the registration surface.

30. The method of claim 29 wherein positioning the media holder includes positioning the entire media holder and the small media in the media tray.

31. A media handling system comprising:

a tray having a media side edge registration surface;

a holder positioned within the tray, the holder movable along the media edge registration surface, the holder including:

a floor configured to extend below media held by the holder; and a first wall, wherein the holder is movable between a first position in which the first wall is configured to face the media edge registration surface while engaging edges of media while being movable towards the edge registration surface so as to move media laterally into contact with the edge registration surface and away from the media edge registration surface.

32. The system of claim 31 wherein the first wall is resiliently biased towards the media edge registration surface.

33. The system of claim 31 wherein the floor is movable with the first wall.

34. The system of claim 31 including:

a first holder registration surface extending parallel to and spaced from the media edge registration surface; and a registration ridge coupled to the holder and configured to slide along the first holder registration surface during movement of the holder relative to the media edge registration surface.

35. The system of claim 31 wherein the holder includes a clamp resiliently biased towards one of a clamped position and an unclamped position.

36. The system of claim 31 wherein the holder includes a lateral opening configured to permit media held by the holder to laterally project beyond the holder into engagement with the media edge registration surface.

* * * * *